United States Patent [19]

Saitoh et al.

[11] Patent Number: 4,753,498
[45] Date of Patent: Jun. 28, 1988

[54] OPTICAL READER

[75] Inventors: Hiroshi Saitoh; Hiromitsu Okada; Hironobu Watanabe; Hiroshi Watanabe; Michio Waki; Keizo Shiihara; Hiromitsu Kijima, all of Tokyo; Yukito Matsuo; Tsuyoshi Ishida, both of Kanagawa, all of Japan

[73] Assignees: Tokyo Kogaku Kikai Kabushiki Kaisha, Tokyo; Kabushiki Kaisha Toshiba, Kawasaki, both of Japan

[21] Appl. No.: 841,757

[22] Filed: Mar. 20, 1986

[30] Foreign Application Priority Data

Mar. 22, 1985 [JP] Japan .................. 60-57732
Mar. 22, 1985 [JP] Japan .................. 60-57733

[51] Int. Cl.$^4$ .............................. G02B 26/10
[52] U.S. Cl. .................... 350/6.8; 350/6.7; 358/208
[58] Field of Search ............... 350/6.5–6.8; 358/208; 250/236

[56] References Cited

U.S. PATENT DOCUMENTS

| | | | |
|---|---|---|---|
| 3,646,568 | 2/1972 | Woywood | 350/6.8 |
| 3,705,755 | 12/1972 | Baer | 350/6.8 |
| 3,818,444 | 6/1974 | Connell | 350/6.8 |
| 3,973,826 | 8/1976 | Lobb | 350/6.8 |
| 4,121,251 | 10/1978 | Arai | 358/208 |
| 4,171,917 | 10/1979 | Pirlet | 350/6.8 |
| 4,413,878 | 11/1983 | Lettington | 350/6.7 |
| 4,432,598 | 2/1984 | Akanabe et al. | 350/6.7 |

Primary Examiner—John K. Corbin
Assistant Examiner—Loha Ben
Attorney, Agent, or Firm—Finnegan, Henderson, Farabow, Garrett and Dunner

[57] ABSTRACT

The present invention relates to an optical reader for scanning a surface to be scanned by using information beam ray such as laser beam ray and optically reading a recorded information such as bar code recorded in the surface to be scanned. The optical reader is constituted such that optical beam emitted from a light source is reflected on a first rotary multiface mirror to scan on a surface to be scanned, and information beam reflected on the surface to be scanned is reflected on a second rotary multiface mirror to guide to an opto-electric transforming means. A scanning optical path for permitting the optical beam from the light source to pass therealong is formed independently from a reflecting optical path for permitting the information beam from the surface to be scanned to pass therealong. A condensing lens system including a bore diameter large enough to cover the scanning optical path and reflecting optical path as well as a single optical axis is disposed between the surface to be scanned and the first and second rotary multiface mirrors.

18 Claims, 5 Drawing Sheets

OPTICAL READER

BACKGROUND OF THE INVENTION

This invention relates to an optical reader for scanning a surface to be scanned by using an information beam ray such as a laser beam ray and optically reading recorded information such as a bar code recorded on the surface to be scanned.

Heretofore, there has been known an optical reader, wherein an optical beam emitted from a laser light source is guided to a scanning rotary multiface mirror, the optical beam being swung in the rotating direction of the scanning rotary multiface mirror to scan a surface of an object to be measured in which bar code etc. are recorded. The information beam reflected from the surface to be scanned being condensed and guided to an opto-electric transforming means for opto-electrically transferring the same in order to optically read information recorded on the surface to be scanned.

There are two types of conventional optical readers; one is the entire scanning area condensing system which includes as light condensing means a condensing lens for condensing and imaging the information beam reflected from the surface to be scanned on a light receiving surface of an opto-electric transforming mean. Light in the entire scanning area is condensed as an information beam by the condensing lens irrespective of location of a part illuminated by the information beam in the scanning direction of the surface to be scanned. The other is the illuminating part condensing system wherein the information beam is reflected again by a scanning rotary multiface mirror and guided to an opto-electric transforming system. In this second system only the information beam from an illuminating part of the surface to be scanned which is illuminated by the optical beam is received.

An optical reader employing the illuminating part condensing system is constituted such that a perforated mirror for dividing an optical path is disposed between a laser light source and a scanning rotary multiface mirror. The optical beam being projected through the perforated portion of the perforated mirror, and an information beam reflected from a surface to be scanned being reflected by the scanning rotary multiface mirror and perforated mirror to be guided to an opto-electric transforming means.

Since the conventional optical reader of the entire scanning area condensing system is constituted such that outer light other than the optical beam is also read as an information beam, peripheral outer light is taken in as an undesirable noise portion. Accordingly, when peripheral illumination of the surface to be scanned illuminated by a room illumination is large, it cannot read the information beam as a signal due to adverse affection of the peripheral illumination.

In the conventional reader employing the illuminating part condensing system, a scanning optical path of an optical beam and a reflection optical path thereof are identical between the perforated mirror and the surface to be scanned. Accordingly, it has the disadvantage that diffracted light of the projected optical beam diffracted by the perforated portion of the perforated mirror and scattered light scattered by the scanning rotary multiface mirror and other optical parts are guided as a noise portion directly to the opto-electric transforming means. Further, the information beam is received through the reflecting surface of the perforated mirror. Accordingly, it has the disadvantage that the information light beam guided to the opto-electric transforming means is limited in quantity.

Furthermore, in the case optical members such as a reflecting prism, etc. are disposed within the scanning optical path so that the projected optical beam is divided into a plurality of scanning beams to draw a plurality of scanning paths on the surface to be scanned, the information beam to be received is also limited by these optical members which makes it difficult to increase the quantity level of the information beam to be received.

SUMMARY OF THE INVENTION

It is therefore an object of the present invention to provide an optical reader, wherein a noise portion mixed in an information beam is decreased, and a reflecting information beam to be received is increased in its quantity level, so that a signal to noise ratio (S/N) can be made large when compared with the prior art devices.

Another object of the invention is to provide an optical reader which is compact in size.

A further object of the invention is to provide an optical reader, wherein an information beam can be read correctly even if the scanning direction with respect to the surface to be scanned should be inclined.

The present invention includes a scanning rotary multiface mirror for reflecting an optical beam and guiding the beam to a surface to be scanned, and a condensing rotary multiface mirror rotated synchronously with the scanning rotary multiface mirror for guiding an information beam reflected from the surface to be scanned to an opto-electric transfer element. The scanning optical path from the optical beam emitting light source to the surface to be scanned through the scanning rotary multiface mirror and the reflecting optical path from the surface to be scanned to the opto-electric transforming means through the condensing rotary multiface mirror are separate to eliminate undesirable noise in the information beam.

According to the present invention, the optical beam is guided to the surface to be scanned while being swung by the reflecting surface of the scanning rotary multiface mirror in its rotating direction to effect scanning with respect to the surface to be scanned. The information beam reflected from an illuminating part of the surface to be scanned is guided to the condensing rotary multiface mirror via the reflecting optical path which is different and separate from the scanning optical path extending from the optical beam emitting light source to the surface to be scanned through the scanning rotary multiface mirror. The information beam is deflected by the condensing multiface mirror in the direction where the opto-electric transfer element is located.

In an optical reader according to the present invention for condensing an information laser beam reflected from the illuminating part of the surface to be scanned which is illuminated by a scanning laser beam, the scanning optical path extending from an optical beam emitting light source to the surface to be scanned through the scanning rotary multiface mirror, and the reflecting optical path extending from the surface to be scanned to the opto-electric transforming surface through the condensing rotary multiface mirror are configured separately. Due to the foregoing configuration, noise from the scanning optical path transferred to the reflecting optical path can be decreased, and signal to noise ratio can be made comparatively large.

Preferably, a beam condensing lens is used in the scanning optical system and the reflecting optical system, and the information beam reflected from the surface to be scanned is transformed into generally parallel pencils of rays and guided to the condensing rotary multiface mirror. Accordingly, the present invention is compact in its construction.

Other objects and advantages of the present invention will become more apparent by the following description with reference to the accompanying drawings.

BRIEF DESCRIPTION OF THE DRAWINGS

With reference to the drawings in which like reference numerals refer to like parts throughout, the following is a list of those numerals and their associated parts.

Figure 1:
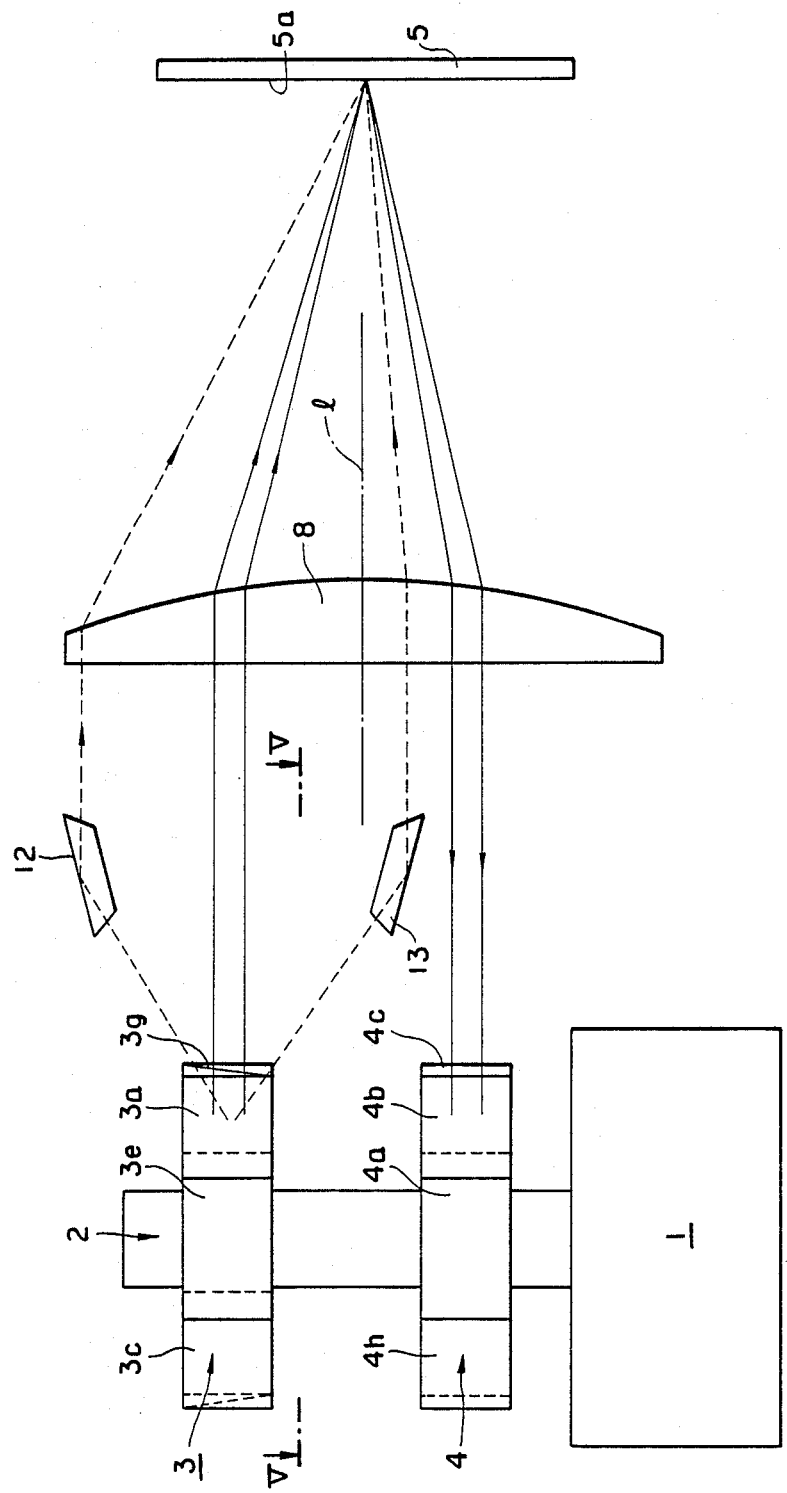
FIG. 1 is a front view of an optical system of an optical reader according to the present invention.

1 . . . drive motor
2 . . . rotary center shaft
3 . . . scanning rotary multiface mirror (first rotary multiface mirror)
4 . . . condensing rotary multiface mirror (second rotary multiface mirror)
5a . . . surface to be scanned
6 . . . laser light source
8 . . . beam condensing lens (condensing lens system)
11 . . . opto-electric transforming means
12,13 . . . reflecting prism (reflecting member)

DETAILED DESCRIPTION OF THE PREFERRED EMBODIMENTS

Figure 2:
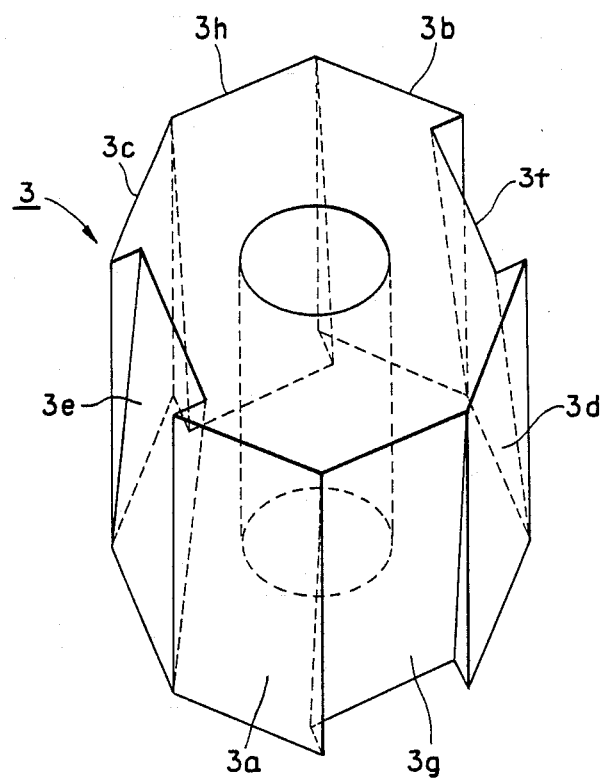
FIG. 2 is a perspective view of the scanning rotary multiface mirror shown in FIG. 1.
Figure 3:
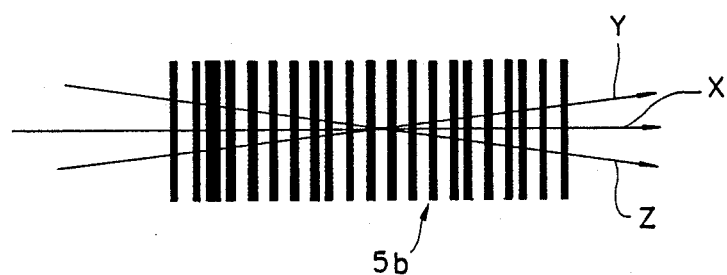
FIG. 3 is a schematic illustration for explaining the scanning of bar codes recorded on the surface to be scanned shown in FIG. 1.

FIG. 1 illustrates an optical system of an optical reader according to the present invention, in which 1 denotes a drive motor, and 2 denotes a rotary center shaft thereof. The rotary center shaft 2 has fixedly mounted thereon a scanning rotary multiface mirror 3 functioning as a first rotary multiface mirror and a condensing rotary multiface mirror 4 functioning as a second rotary multiface mirror each constituting a part of a reflecting optical system. The scanning rotary multiface mirror 3 includes a plurality of reflecting surfaces 3a through 3h formed about the periphery of the rotary center shaft 2. As shown in FIG. 2, the mirror 3 is preferably formed in an octagonal column shape, and includes, at its side surfaces, parallel reflecting surfaces 3a through 3d inclined at equal angles with respect to the rotary center shaft 2, upwardly inclining reflecting surfaces 3e, 3f converging upwardly with respect to the rotary center shaft 2, and downwardly inclining reflecting surfaces 3g, 3h converging downwardly with respect to the rotary center shaft 2. The parallel reflecting surfaces, upwardly inclining reflecting surfaces, and downwardly inclining reflecting surfaces are preferably formed sequentially in the rotating direction of the scanning rotary multiface mirror 3 as shown in FIG. 2. The reflecting surfaces 3a through 3h of scanning rotary multiface mirror 3 have different angles with respect to the rotary center shaft 2. The parallel reflecting surface 3a and parallel reflecting surface 3b, the parallel reflecting surface 3c and parallel reflecting surface 3d, the upwardly inclining surface 3e and upwardly inclining reflecting surface 3f, and the downwardly inclining reflecting surface 3h and downwardly inclining reflecting surface 3g respectively are located opposite each other with the rotary shaft 2 disposed therebetween. The scanning rotary multiface mirror 3 has the function that the optical beam reflected therefrom is swung in its rotating direction to scan a surface 5a to be scanned of an object 5 to be scanned. The surface 5a to be scanned is recorded, for example, with a bar code 5b as shown in FIG. 3.

Figure 4:
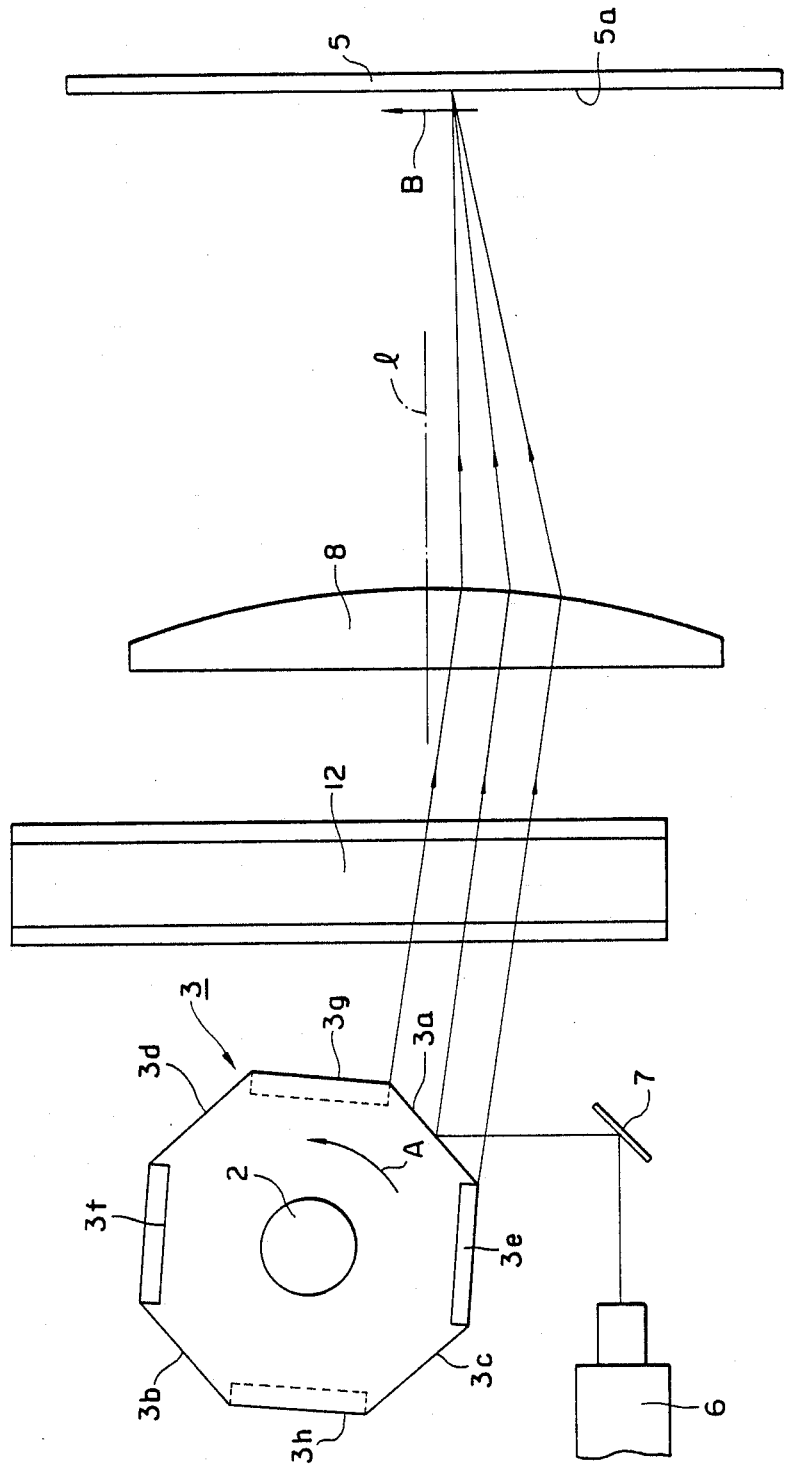
FIG. 4 is a plan view of the optical system of the optical reader shown in FIG. 1.
Figure 5:
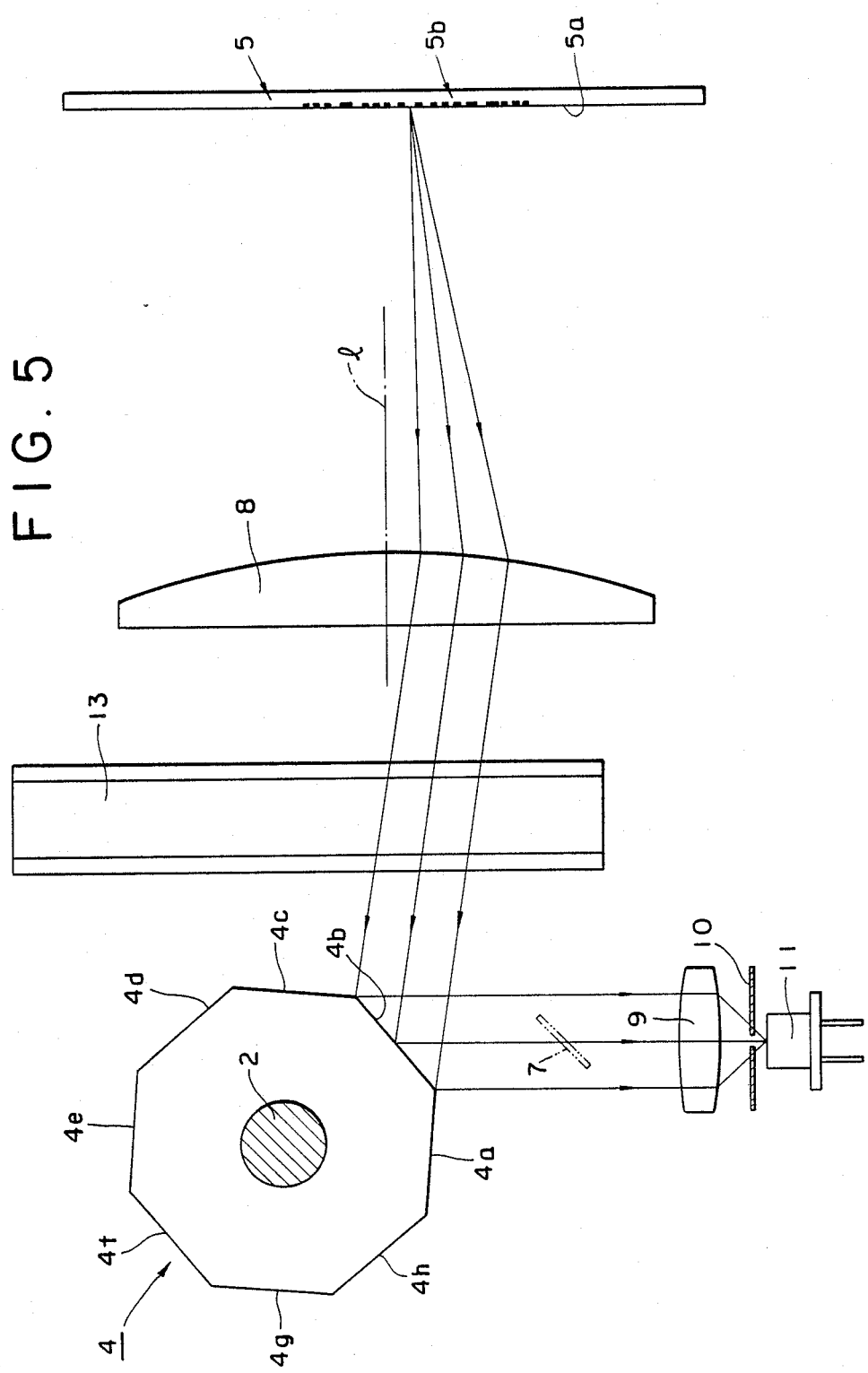
FIG. 5 is a sectional view taken on line V—V of FIG. 1.

The optical beam is preferably a laser beam in this embodiment. In FIG. 4, numeral 6 denotes a laser light source functioning as a light source for emitting an optical beam. The laser beam emitted from the laser light source 6 is reflected by a reflecting mirror 7 and guided to the reflecting surface of the scanning rotary multiface mirror 3. In FIG. 4, an arrow A designates the rotating direction of the scanning rotary multiface mirror 3, and an arrow B designates the scanning direction of the laser beam. Disposed between the scanning rotary multiface mirror 3 and the object 5 to be scanned is a beam condensing lens 8 functioning as a condensing lens system. Reference character 1 denotes an optical axis thereof. The beam condensing lens 8 as shown in FIG. 5 includes a bore diameter large enough to cover an area sufficient for permitting a laser beam reflected by the scanning rotary multiface mirror 3 to pass therethrough and an area sufficient for permitting an information laser beam reflected from the surface 5a to be scanned to pass therethrough, as well as a single optical axis 1. The lens 8 has the function of converging the laser beam onto the surface 5a to be scanned. The information laser beam reflected from the surface 5a to be scanned and functioning as an information beam is guided to the condensing rotary multiface mirror 4 after being transformed into generally parallel pencil of rays by condensing lens 8. The condensing rotary multiface mirror 4 is preferably formed in an octagonal column shape and includes parallel reflecting surfaces 4a through 4h each having an identical inclined angle with respect to the rotary center shaft 2. The condensing rotary multiface mirror 4 has the function of guiding the information laser beam to an opto-electric transforming means 11 through a condensing lens 9 and a slit plate 10. The reflecting mirror 7 is disposed at an upper location with respect to the reflecting optical path of the information laser beam so as not to interrupt the information laser beam. The condensing rotary multiface mirror 4 and scanning rotary multiface mirror 3 are preferably disposed on a common, rotating center shaft 2 which is rotated to synchronously turn mirrors 3 and 4. The respective reflecting surfaces are always faced toward an illuminating part to be scanned which is illuminated by the laser beam. Although in the preferred embodiment mirrors 3 and 4 are disposed on a common, rotating shaft 2, the invention is not limited thereto. Mirrors 3 and 4 may be disposed on separate rotating shafts which are parallel to one another and synchronously rotated. The slit plate 10 is formed with a slit extending in the direction perpendicular to the scanning direction and having a small width with respect to the scanning area. The plate on diaphragm 10 has the function that peripheral outer light contributing noise is cut off and only light from the scanned illuminated part is guided to the opto-electric transforming means 11. The slit shape of the diaphragm for cutting off the outer light functions to guide light from the scanned illuminated part to the opto-electric transforming means 11, even if a slant scanning is effected by the scanning rotary multiface mirror 3 as will be described.

Between the scanning rotary multiface mirror 3 and the surface 5a to be scanned, reflecting members 12, 13 are disposed in such a manner that a plurality of scanning paths of the laser beam reflected from the scanning rotary multiface mirror 3 are intersected at the center of about the surface 5a to be scanned. The detail thereof is as follows.

Figure 6:
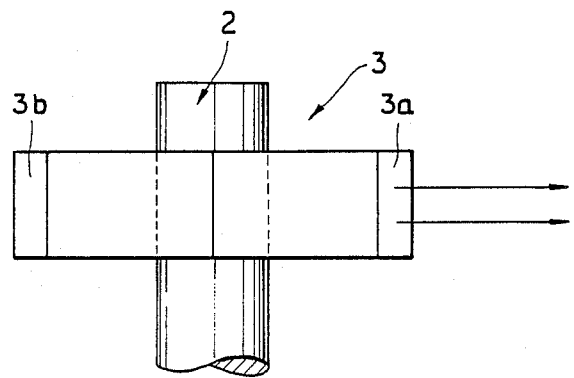
FIGS. 6, 7, and 8 are conceptual views for explaining the reflecting direction of the scanning rotary multiface mirror shown in FIG. 1.
Figure 7:
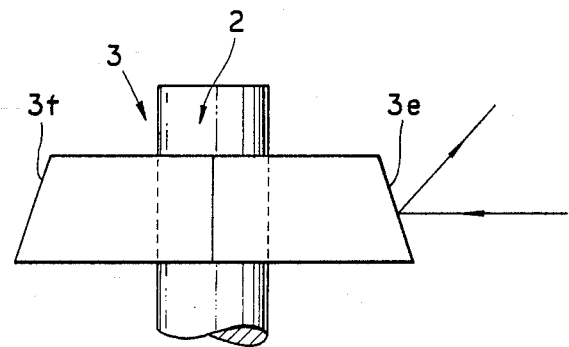
Figure 8:
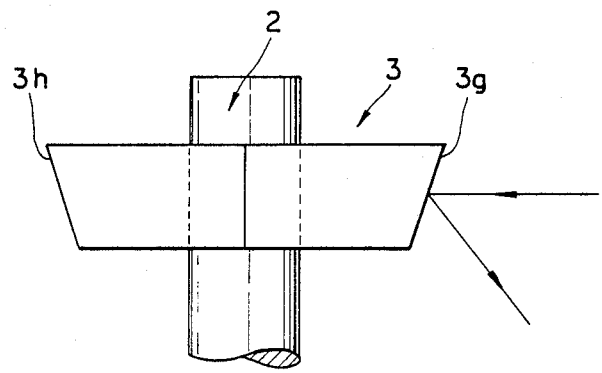

The parallel reflecting surfaces 3a, 3b, as shown in FIG. 6, have the function that the laser beam is reflected in the horizontal direction and guided to the beam condensing lens 8. The upwardly inclining reflecting surfaces 3e, 3f, as shown in FIG. 7, have the function that the laser beam is reflected upwardly and guided to the reflecting prism 12 functioning as a reflecting member. The downwardly inclining surfaces 3g, 3h, as shown in FIG. 8 have the function that the laser beam is reflected downwardly and guided to the reflecting prism 13 functioning as a reflecting member. The upwardly inclining reflecting surfaces, 3e, 3f have the function that the incident direction of the laser beam is maintained constant to draw a slanted scanning path Y with respect to a scanning path X obtained by the parallel reflecting surfaces 3a through 3d since an apparent angle is varied from time to time during the rotation of the scanning rotary multiface mirror 3 as shown in FIG. 3. Similarly, the downwardly inclining reflecting surfaces 3g, 3h have the function that the incident direction of the laser beam is maintained constant to draw a slanted scanning path Z with respect to a scanning path X obtained by the parallel reflecting surfaces 3a through 3d during the rotation of the scanning rotary multiface mirror 3. Accordingly, the reflecting prisms 12 and 13, as shown in FIG. 1, are optically disposed so that the scanning paths X, Y and Z are intersected with respect to one another. Due to the foregoing, a correct reading can be obtained even in the case that the bar code 5b is disposed at angles with respect to the scanning paths. In the case that the condensing rotary multiface mirror 4 is formed in a configuration identical with that of the scanning rotary multiface mirror 3, a pin hole plate can be used instead of the slit plate 10, which functions to more effectively cut off the outer light as a cause of noise.

According to this embodiment, since the scanning rotary multiface mirror 3 and the condensing rotary multiface mirror 4 are rotated synchronously, an information laser beam can be condensed from the illuminating part of the surface to be scanned which is illuminated by the laser beam. Further, since the scanning path from the laser light source 6 to the surface 5a to be scanned through the scanning rotary multiface mirror 3 is constituted differently from the reflecting optical path from the surface 5a to the opto-electric transforming means 11 through the condensing rotary multiface mirror 4, the information laser beam can be guided to the opto-electric transforming means 11 through a different optical path. Accordingly, there is not required optical means for separating the information laser beam from the scanning optical path which is required in the case where the scanning optical path and the reflecting optical path are identical. In addition, a noise portion which is present where the scanning optical path and the reflecting optical path are identical can be decreased. Furthermore, since the beam condensing lens 8 has both the functions that the laser beam is converged on the surface 5a to be scanned and that the information laser beam is condensed, an optical reader can be made small in size.

Although the present invention has been described in the form of one preferred embodiment, the present invention should not be limited to the embodiment. For example, in the embodiment, the scanning rotary multiface mirror 3 and the condensing rotary multiface mirror 4 are separately mounted on the rotary center shaft 2 of the same motor 1 and rotated in synchronously. Alternatively, the motors can be disposed separately and the respective rotary shafts can be separately mounted in parallel relation so that they are rotated synchronously. Moreover, in the embodiment, the scanning rotary multiface mirror 3 is made separately from the condensing rotary multiface mirror 4. Alternatively, they can be made integrally.

What is claimed is:

1. An optical reader comprising:
   a light source for emitting an optical beam;
   a first rotary multiface mirror means, including a plurality of reflecting surfaces disposed about the periphery of a rotary center shaft, for reflecting the optical beam emitted from said light source from said reflecting surfaces along a first optical path to scan a surface to be scanned; and
   a second rotary multiface mirror means, including a plurality of reflecting surfaces disposed about the periphery of a rotary center shaft, said reflecting surfaces of said second rotary mirror means being synchronously rotated with said first rotary multiface mirror means, for reflecting an information beam reflected from the surface to be scanned along a second optical path to an optoelectric transforming means;
   said first optical path being distinct from said second optical path to thereby increase the signal to noise ratio of said information beam.

2. An optical reader according to claim 1 further including a condensing lens means disposed between said surface to be scanned and said first and second rotary multiface mirror means, said condensing lens means having a bore diameter of sufficient size to permit the optical beam reflected from said first rotary multiface mirror means to pass therethrough and to permit the information beam reflected from the surface to be scanned to pass therethrough, for condensing the optical beam on the surface to be scanned and for transforming the information beam reflected from the surface to be scanned into parallel pencils of rays.

3. An optical reader according to claim 1, wherein adjacent reflecting surfaces of said first rotary multiface mirror means are formed with different inclined angles with respect to the axis of the rotary center shaft to thereby form a plurality of non-parallel scanning paths on said surface to be scanned.

4. An optical reader according to claim 3, which further includes reflecting means, disposed between said first rotary multiface mirror means and said surface to be scanned, for intersecting said plurality of scanning paths of the optical beam reflected from said first rotary multiface mirror means on said surface to be scanned.

5. An optical reader according to claim 1, 2, 3 or 4, wherein said rotary center shaft of said first rotary multiface mirror means and said rotary center shaft of said second multiface mirror means are disposed in parallel relation with each other.

6. An optical reader according to claim 1, 2, 3 or 4, wherein said first rotary multiface mirror means and said second rotary multiface mirror means are rotatable about a common center shaft.

7. An optical reader according to claim 6, wherein said first rotary multiface mirror means and said second rotary multiface mirror means are integrally formed on said common center shaft.

8. An optical reader according to claim 7, including a slit diaphragm disposed between said second rotary multiface mirror means and said opto-electric transforming means, wherein said plurality of reflecting surfaces of said second rotary multiface mirror means are disposed at equal angles with respect to the axis of the rotary center shaft of said second rotary multiface mirror means, such that the reflected light from said reflecting surfaces will enter into said opto-electric transforming means through said slit diphragm.

9. An optical reader for reading coded information on a surface to be scanned, comprising:
an optical source for emitting an optical beam;
scanning rotary multiface mirror means, disposed on a rotary center shaft and having a plurality of reflecting surfaces disposed about the periphery of said center shaft with each of said reflecting surfaces being disposed at one of at least three different angles relative to the axis of said center shaft, for reflecting said optical beam from said reflecting surfaces to form at least three scanning beams each having a distinct optical path in accordance with said at least three different angles;
reflecting optical means, disposed between said scanning mirror means and said surface to be scanned, for directing two of said at least three scanning beams to a common intersection with a third scanning beam on said surface to be scanned;
photoelectric conversion means for photoelectrically converting at least three return beams, generated by said at least three scanning beams being reflected from said surface to be scanned, into electrical signals; and
condensing rotary multiface mirror means, synchronously rotatable with said scanning rotary multiface mirror means and disposed between said surface to be scanned and said photoelectric conversion means, for bypassing said reflecting optical means and directing said at least three return beams onto said photoelectric conversion means.

10. An optical reader according to claim 9, including condensing lens means, having a bore diameter sufficient to cover a zone through which said at least three scanning beams and said at least three return beams pass, for condensing said scanning beams on said surface to be scanned and for collimating said return beams into a parallel light flux, said condensing lens means being disposed between said surface to be scanned and said scanning rotary multiface mirror means and between said surface to be scanned and said condensing rotary multiface mirror means.

11. An optical reader according to claim 9, wherein said scanning rotary multiface mirror means and said condensing rotary multiface mirror means are coaxially supported on said rotary center shaft.

12. An optical reader according to claim 11, wherein said return beams enter into said photoelectric conversion means through a slit diaphragm.

13. An optical reader according to claim 11, wherein said condensing rotary multiface mirror means includes a plurality of reflecting surfaces disposed parallel to the axis of said center shaft.

14. An optical reader according to claim 13, wherein said return beams enter into said photoelectric conversion means through a pin hole plate.

15. An optical reader according to claim 9, wherein said condensing rotary multiface mirror means is rotatable about a rotary center shaft, and said rotary center shaft of said scanning rotary multiface mirror means is disposed parallel with said rotary center shaft of said condensing rotary multiface mirror means.

16. An optical reader according to claim 9, wherein said scanning rotary multiface mirror means is integrally formed with said condensing rotary multiface mirror means.

17. An optical reader according to claim 9, wherein a bar code is formed on said surface to be scanned.

18. An optical reader according to claim 9, wherein said light source is a laser optical source.

* * * * *